Figure 1:
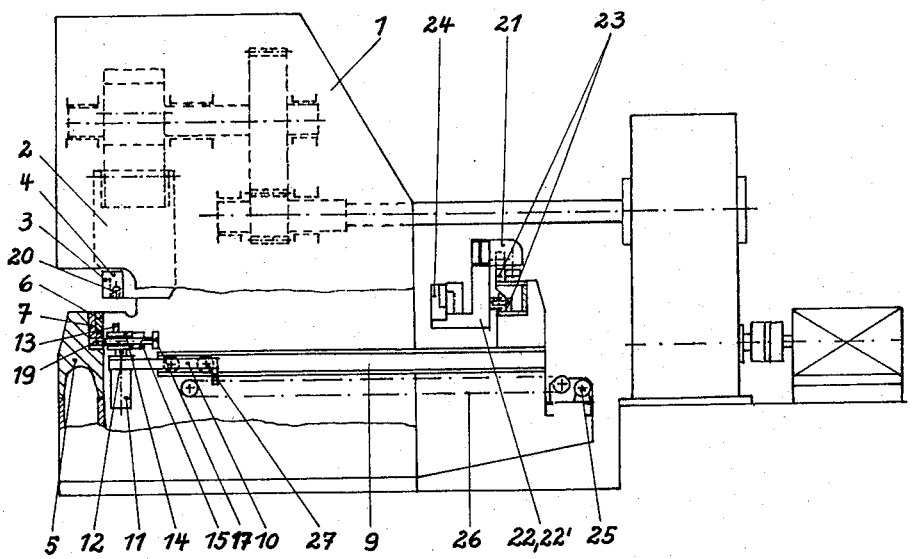

United States Patent Office 3,348,704
Patented Oct. 24, 1967

3,348,704
MEANS FOR EXCHANGING UNITS, EACH CONSISTING OF A SHEAR BLADE AND ITS MOUNTING, IN MACHINES FOR SHEARING METAL SHEETS OR PLATES
Hermann Boos, Buderich, near Dusseldorf, and Georg Bollig, Dusseldorf-Oberkassel, Germany, assignors to Schloemann Aktiengesellschaft, Dusseldorf, Germany
Filed Feb. 15, 1965, Ser. No. 432,754
4 Claims. (Cl. 214—1)

In sheet-metal shearing machines it is known to transport the units, each consisting of a shear blade and its mounting, for re-sharpening, into a workshop, and there, in order to avoid the tedious adjusting on the shear stand, to bring them back to a constant dimension, after the sharpening, by inserting shims between the blade and the mounting.

Blades and their mountings, on account of their great weight, are difficult to manipulate. Appliances have therefore already been suggested for facilitating the dismantling and assembling of the units, and thus shortening the time of stoppage of the shearing line. Thus, for example, on a table parallel to the blades, a slide has been mounted, which, for the accommodation of the units, is equipped with pegs which are adjustable by hand by means of screw threads, and which fit into recesses in the mounting. Upon this slide the units are thereupon conveyed to the crane.

A further known exchanging means consists of a frame provided with pegs, which is supported upon rollers. Here again the pegs engage in corresponding recesses in the blade units. With this manually operated appliance the blade units are placed upon a holding-down means, and, after being lowered by the crane, are transported away. In this connection it has also been proposed to cover the roller table with a metal plate, upon which the frame provided with rollers can travel, carrying the blade units.

With the appliances described, the exchanging operation still requires manual work, since the operator has to clamber into the shearing machine. Upper and lower blade units cannot be exchanged at the same time, so that the operation takes up a great deal of time. A further disadvantage of the appliances mentioned consists in the fact that the crane has to be available during the changing of the blades, and is therefore not free for other work that might advantageously be carried out during the stoppage of the shearing line.

The object of the invention is to provide automatic apparatus for the simultaneous changing of the upper and lower blade units of a sheet-metal shearing machine without requiring the use of a crane. The blade-changing apparatus according to the invention comprises at least one carriage, which is provided with driving means and is movable upon a guideway, and a mounting or support carried by a piston slidable in a cylinder secured vertically in the frame of the carriage and connected to a source of fluid under pressure. On the said mounting a second cylinder is arranged horizontally, and is likewise connected with a source of pressure liquid. A piston slidable horizontally in this second cylinder is connected by its piston rod with a crossbar, which in its turn is connected with horizontal rods guided through the mounting and directed towards the lower blade unit.

The carriage guideway may be arranged between the cheeks of the shearing-machine housing, and may extend from the shear saddle to a transversely movable reception rack located outside the shear frame, with deposition arms for two sets of blades.

Alternatively, however, the carriage guideway may extend through a gap in the shear housing, from the shear saddle to deposition stations for two sets of blades, provided outside the shear housing.

A further development of the blade-changing apparatus according to the invention comprises two carriages, each provided with driving means and both movable upon a guideway. Each carriage is provided with a mounting carried by a piston rod vertically slidable in a cylinder secured in the frame of the carriage and connected with a source of pressure fluid. On each of these mountings is horizontally arranged a cylinder likewise connected with a source of pressure fluid, their pistons each being connected by a cross-bar with horizontal rods guided through the mounting. The guideway for the carriages extends through a gap in a side cheek of the shear housing from the shear saddle to two parallel guideway elements arranged side by side upon a transversely movable reception rack outside the shear housing. In this way the two blades can both be exchanged at the same time, without the use of a crane. The construction of the carriage with a vertically adjustable mounting and with horizontally adjustable holding means is particularly advantageous, because both the lifting of the blade units from the shear saddles and the deposition of these units upon stationary reception racks can be carried out therewith.

An alternative arrangement is possible in which the reception racks arranged outside the shear frame are adjustable in height.

Figure 2:
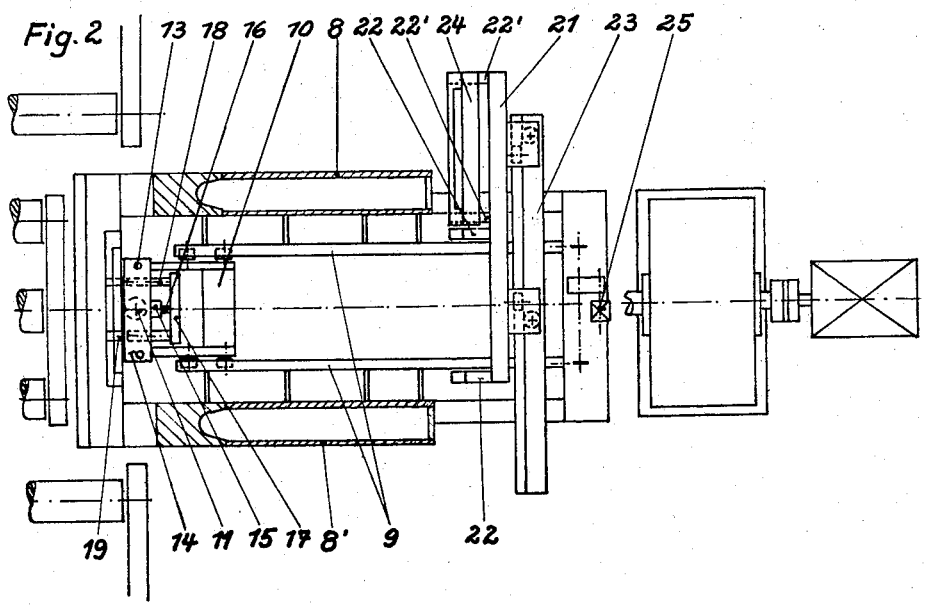
Figure 3:
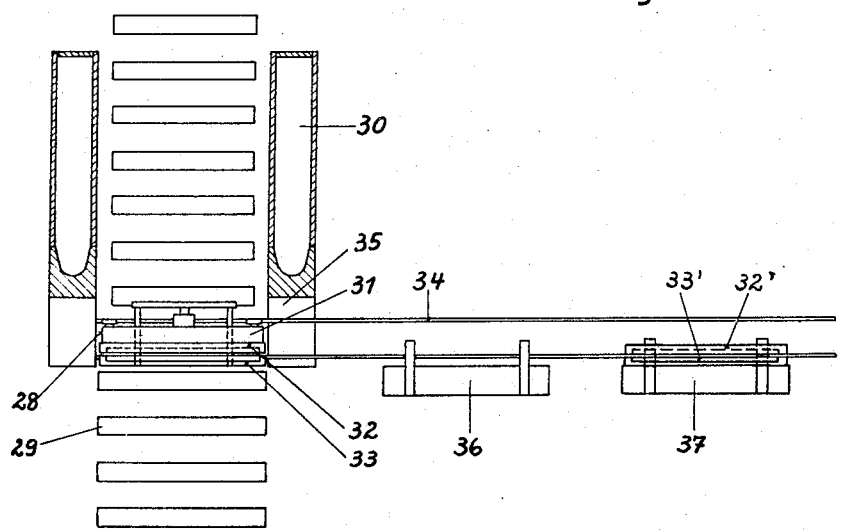
Figure 4:
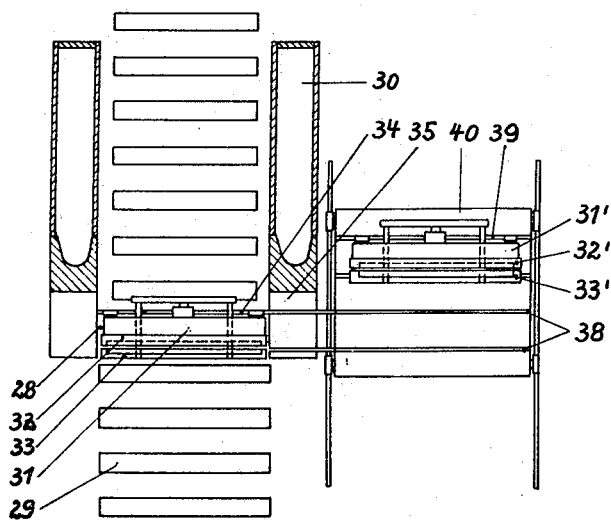

Three embodiments of the invention are illustrated by way of example in the accompanying drawings, in which:
FIGURE 1 is a side view of border shears, with the blade-changing device in section;
FIGURE 2 shows a plan view thereof, with the upper part of the shearing machine cut away;
FIGURE 3 shows a plan view of a dividing shearing machine, arranged transversely to the roller table, with a changing appliance having stationary depositing racks; and
FIGURE 4 shows another construction of the changing appliance, with two carriages and with two guideway elements mounted upon a reception rack which is displaceable parallel to the roller table.

In an edge-trimming shearing machine 1 arranged at the roller table, a unit consisting of an upper shear blade 3 and its mounting 4 is arranged on an upper shearing-machine saddle 2, and a unit consisting of a lower shear blade 6 and its mounting 7 is arranged on the lower shearing-machine saddle 5. Between the shear housings 8 and 8' are arranged guideways 9, in which a carriage 10 can travel.

In the front portion of the carriage 10 is vertically accommodated a cylinder 11, in which slides a piston, which, by way of a piston rod 12, carries a support or mounting 14, provided on its upper side with pegs 13. On the mounting 14, and parallel to the guideways 9, is arranged a cylinder 15, the piston of which is connected, by way of a piston rod 16, with a cross-bar 17, to the ends of which are secured rods 18, which extend through the support 14 and are directed towards recesses 19 in the lower blade unit 6, 7.

Upon the cylinder 11 being supplied with pressure fluid, the support 14 is lifted up right underneath the upper blade unit 3, 4, the pegs 13 penetrating into recesses 20 in the unit 3, 4. After release of the fastenings of the upper blade, the unit 3, 4, with the support 14, can then be lowered until the rods 18 connected with the cross-bar 17 are in alignment with the recesses 19 in the lower blade units. The horizontal cylinder 15 can now be energised, as a result of which the rods 18 penetrate into the recesses 19.

After release of the lower blade-fastenings, the set of blades consisting of the units 6, 7 and 3, 4 can be transported by the carriage 10 to the rear of the shearing machine, where a reception rack 21, with two pairs of carrying arms 22, 22', is transportable on rails 23. Upon the arms 22' of the rack 21 a set of sharp blades 24 has been deposited by the crane.

With the help of the cylinders 11 and 15 of the carriage 10, the set of blunt blades 3, 4 and 6, 7 is deposited upon the free carrying arms 22, and, after the transporting of the rack, the set of sharp blades 24 is taken up and transported to the shearing-machine saddles. The mounting of the blade units is effected correspondingly to their demounting.

For the driving of the carriage 10 a motor 25 drives a chain 26, which is supported upon rollers, and in which a peg 27 secured to the carriage 10 engages.

The plate-shearing or sheet-metal shears 28 illustrated in plan in FIGURES 3 and 4 cut transversely to the roller table 29. Their housings 30 are arranged on both sides of the roller table 29. A carriage 31 for the accommodation of the blade units 32 and 33 is movable upon rails 34, which guide it through a gap 35 in the housing, and out of reach of the shears. In the construction according to FIGURE 3, along the rails 34 extending out of the shearing-machine frame, reception racks 36 and 37 are provided for two sets of blades. The rack 37 carries the set of sharp blades 32', 33'.

In the construction according to FIGURE 4, rails 38 located outside the area of the shearing machine, with a further pair of rails 39 extending parallel thereto, are arranged upon a reception rack 40 movable parallel to the roller table. Here two carriages 31 and 31' serve alternately as places of deposit for a blunt set of blades and for a sharp set of blades, and as transporting means from and to the shearing-machine saddles.

We claim:

1. Blade-changing apparatus, for changing the upper and lower blade units, each consisting of a blade and a blade-holder, of a sheet-metal shearing machine, comprising: a carriage adapted to carry the blade units, a guideway on which the carriage can travel, means for driving the carriage along the guideway, a cylinder secured vertically in the carriage, a piston and piston rod slidable in the cylinder, a mounting carried on the upper end of the said piston rod, means for supplying pressure fluid to the cylinder so as to bring the mounting into engagement with the upper blade unit, a horizontal cylinder secured to the said mounting, a piston and piston rod slidable in the horizontal cylinder, a cross-bar secured to the piston rod of the horizontal cylinder, horizontal rods secured to the said cross-bar and guided through the mounting towards the lower blade unit, and means for supplying pressure fluid to the horizontal cylinder in order to bring the horizontal rods into engagement with the lower blade unit.

2. Blade-changing apparatus as claimed in claim 1, further comprising: shearing-machine housings, the guideway for the carriage extending between the housings from the saddle of the shearing machine to a position outside the shearing machine, rails outside the shearing machine extending transversely to the guideway, a reception rack movable upon the said rails, and deposition arms on the reception rack for accommodating two blade units.

3. Blade-changing apparatus as claimed in claim 1, further comprising: shearing-machine housings, the guideway for the carriage extending from the saddle of the shearing machine through a gap in one of the housings to a position outside the shearing machine, rails outside the shearing machine extending transversely to the guideway, a reception rack movable upon the said rails, and deposition arms on the reception rack for accommodating two blade units.

4. Blade-changing apparatus for changing the upper and lower blade units, each consisting of a blade and a bladeholder, for sheet-metal shearing machines, comprising: two carriages, each adapted to carry a blade unit, shearing-machine housings, a guideway on which the carriages can travel, the guideway extending from the shearing-machine saddle, through a gap in a side cheek of the shear housing, to a position outside the shearing machine, means for driving the carriages along the guideway, a cylinder secured vertically in each carriage, a piston and piston rod slidable vertically in each of these cylinders, a mounting carried on the upper end of each vertical piston rod, a horizontal cylinder secured to the said mounting in each carriage, a piston and piston rod slidable in each horizontal cylinder, means for supplying fluid under pressure to the four cylinders, a cross-bar secured to the piston rod of each horizontal cylinder, horizontal rods extending from the cross-bar of each horizontal cylinder through the mounting towards the lower blade unit, a reception rack, located outside the shearing machine, movable transversely to the guideway, and two guideway elements on the reception rack, adapted to be brought alternatively into alinement with the guideway, by transverse movement of the reception rack.

References Cited

UNITED STATES PATENTS

| | | | |
|---|---|---|---|
| 2,996,025 | 8/1961 | Georgeff | 83—698 |
| 3,113,767 | 12/1963 | Halberstadt. | |
| 3,136,182 | 6/1964 | Wegmann et al. | 72—238 |
| 3,150,787 | 9/1964 | Patrignani | 214—514 |

GERALD M. FORLENZA, *Primary Examiner.*

MARVIN A. CHAMPION, *Examiner.*